United States Patent
Kasper et al.

(10) Patent No.: US 10,291,402 B2
(45) Date of Patent: May 14, 2019

(54) METHOD FOR CRYPTOGRAPHICALLY PROCESSING DATA

(71) Applicant: Robert Bosch GmbH, Stuttgart (DE)

(72) Inventors: Bjoern Kasper, Ingersheim (DE); Thorsten Schwepp, Korb (DE); Andreas Soenkens, Remseck am Neckar (DE)

(73) Assignee: ROBERT BOSCH GMBH, Stuttgart (DE)

(*) Notice: Subject to any disclaimer, the term of this patent is extended or adjusted under 35 U.S.C. 154(b) by 126 days.

(21) Appl. No.: 15/005,239

(22) Filed: Jan. 25, 2016

(65) Prior Publication Data

US 2016/0217303 A1 Jul. 28, 2016

(30) Foreign Application Priority Data

Jan. 26, 2015 (DE) .................. 10 2015 201 298

(51) Int. Cl.
| | | |
|---|---|---|
| *H04L 29/08* | (2006.01) | |
| *H04L 9/08* | (2006.01) | |
| *G06F 21/60* | (2013.01) | |
| *H04L 29/06* | (2006.01) | |

(52) U.S. Cl.
CPC .......... *H04L 9/0869* (2013.01); *G06F 21/606* (2013.01); *H04L 9/0861* (2013.01); *H04L 63/061* (2013.01); *H04L 67/12* (2013.01); *H04L 2463/061* (2013.01)

(58) Field of Classification Search
None
See application file for complete search history.

(56) References Cited

U.S. PATENT DOCUMENTS

| | | | | |
|---|---|---|---|---|
| 8,222,989 | B2 * | 7/2012 | Ziska | B60R 25/2018 340/5.1 |
| 2002/0120856 | A1 * | 8/2002 | Schmidt | G05B 19/0426 713/193 |
| 2009/0323967 | A1 * | 12/2009 | Peirce | H04L 9/0869 380/278 |
| 2009/0326759 | A1 * | 12/2009 | Hensel | G06F 8/65 701/31.4 |
| 2011/0138192 | A1 * | 6/2011 | Kocher | G06F 21/602 713/189 |
| 2012/0321077 | A1 * | 12/2012 | Shiota | H04L 9/0866 380/44 |
| 2013/0212704 | A1 * | 8/2013 | Shablygin | G06F 21/6218 726/28 |
| 2014/0075198 | A1 * | 3/2014 | Peirce | H04L 63/0478 713/176 |
| 2014/0079217 | A1 * | 3/2014 | Bai | H04L 63/0869 380/270 |
| 2014/0301550 | A1 * | 10/2014 | Lewis | H04L 9/0825 380/259 |
| 2015/0089236 | A1 * | 3/2015 | Han | H04L 9/3242 713/181 |

(Continued)

*Primary Examiner* — Trang T Doan
(74) *Attorney, Agent, or Firm* — Norton Rose Fulbright US LLP; Gerard Messina

(57) ABSTRACT

In a method for cryptographically processing data which are exchanged between a first unit and a control unit, a derived key is used in this process, which is derived from a secret key and an identifier. The exchanged data are encrypted using the derived key, and the exchanged data are encrypted in a tool chain, which provides the identifier.

7 Claims, 3 Drawing Sheets

(56) References Cited

U.S. PATENT DOCUMENTS

| | | | |
|---|---|---|---|
| 2015/0156013 A1* | 6/2015 | Zhao | H04L 9/0819 380/270 |
| 2015/0172306 A1* | 6/2015 | Kim | H04L 63/1425 726/23 |
| 2015/0180840 A1* | 6/2015 | Jung | G06F 8/654 713/150 |
| 2015/0222604 A1* | 8/2015 | Ylonen | H04L 63/062 713/171 |
| 2016/0035147 A1* | 2/2016 | Huang | H04L 9/0869 701/31.4 |
| 2016/0035148 A1* | 2/2016 | Huang | H04L 9/0866 701/31.4 |
| 2016/0099806 A1* | 4/2016 | Racklyeft | H04L 9/0866 380/281 |
| 2016/0255154 A1* | 9/2016 | Kim | G09C 1/00 726/25 |

* cited by examiner

METHOD FOR CRYPTOGRAPHICALLY PROCESSING DATA

BACKGROUND OF THE INVENTION

1. Field of the Invention

The present invention relates to a method for cryptographically processing data which are exchanged between a first unit, for example a tester, and a control unit which is provided for a motor vehicle. The present invention further relates to a system for carrying out the method.

2. Description of the Related Art

Control units are electronic modules which are used in motor vehicles, for example, to control and regulate processes. For this purpose, the control units are assigned to components of the motor vehicle, whose operation is monitored with the assigned control unit. For this purpose, the control unit reads in data detected by sensors and influences the operation by activating actuators.

The described method may be used in conjunction with an electronic security module, which is used in a control unit, in particular in the automotive field, in safety-relevant areas. In the majority of applications in the safety-relevant areas, the non-manipulatable or non-viewable storing of data is an essential requirement. Cryptographic keys are used in this process, which are used in symmetric or asymmetric encryption methods.

The used keys and encryption methods represent secrets which must be kept secret from attackers. Other applications in safety-relevant areas relate, for example, to the protection against unauthorized modification, for example the storing of modified serial numbers or odometer readings, the suppressing of unauthorized tuning measures, and the like.

It is therefore necessary to provide secure environments in control units, in which functions may be carried out which must view and/or modify these secrets. These environments regularly include a secure central processing unit or CPU, which is also referred to as secure CPU, and a memory module. Such an environment is referred to herein as a hardware security module (HSM). This represents an efficient module having hardware and software components, which improves the protection and the trustworthiness of embedded systems. In particular, the HSM provides support in protecting safety-critical applications and data. An HSM may also be used to reduce the security costs, while offering effective protection against attackers at the same time. Reference is made to FIG. 3 with respect to the fundamental configuration of an HSM.

A tester herein refers to a test environment which is used to test the operability of a control unit. For this purpose, the tester transmits a software application, in particular a software application present in a container, to the control unit.

It should be noted that confidential data and code sequences, for example for data input, may be easily read out from unencrypted software containers. To avoid this, it was suggested to encrypt the data prior to transmission. In known methods, it is provided to transmit the encrypted data together with the key in a software container. The key which is required for encryption is thus present in relatively unsecure form, which results in an impairment of the security of the data.

It should be noted that presently no all-encompassing method is available for encrypting a software container from the creation to the decryption of software containers in the control unit.

BRIEF SUMMARY OF THE INVENTION

The introduced method for the first time provides a procedure which may be used in an all-encompassing manner from the encryption of a software container during the creation to the decryption of this software container in the control unit. In this way, a secure transmission of data between a first unit, for example a tester, and a control unit is possible.

The introduced method may thus be used in one embodiment for encrypting the data, and in one further specific embodiment for decrypting the data. In one further embodiment, the method is used in an all-encompassing manner from the encryption to the decryption. The cryptographic processing thus includes the encrypting and/or the decrypting of the data.

Further advantages and embodiments of the present invention are derived from the description and the accompanying drawings.

It shall be understood that the above-mentioned features and those still to be described hereafter may be used not only in the particular described combination, but also in other combinations, or alone, without departing from the scope of the present invention.

Furthermore, the described method is used in particular in conjunction with an HSM as it is described herein. However, the method is not limited to the use in conjunction with an HSM. All this also applies to the system described herein.

DETAILED DESCRIPTION OF THE INVENTION

Figure 1:
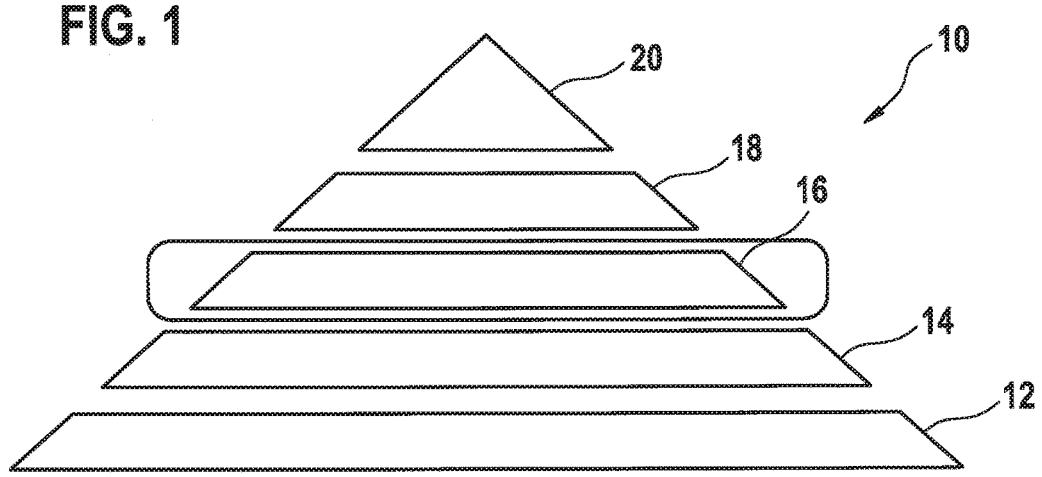
FIG. 1 shows a trust pyramid.

The present invention is schematically shown in the drawings based on specific embodiments and is described in greater detail hereafter with reference to the drawings.

To trust an IT system to the effect that it always operates as is expected, it is necessary to consecutively trust all layers which are integrated in order to create a trustworthy IT system.

FIG. 1 shows a trust pyramid for a typical IT system. This pyramid is denoted overall by reference numeral 10 and includes a layer for an organizational security 12, a layer for a system security 14, a layer for a hardware security 16, a layer for a software security 18, and a topmost layer for trust 20.

To be able to trust the entire IT system, it is necessary that each layer is able to trust in the effective security of the layer underneath, without being able to directly verify this. This means, for example, that a perfect software and hardware security approach may prove useless as a result of a weak security system design underneath. Moreover, it may be that a possible weakness in the system design is not detected or prevented by the upper hardware and software layers.

Figure 2:
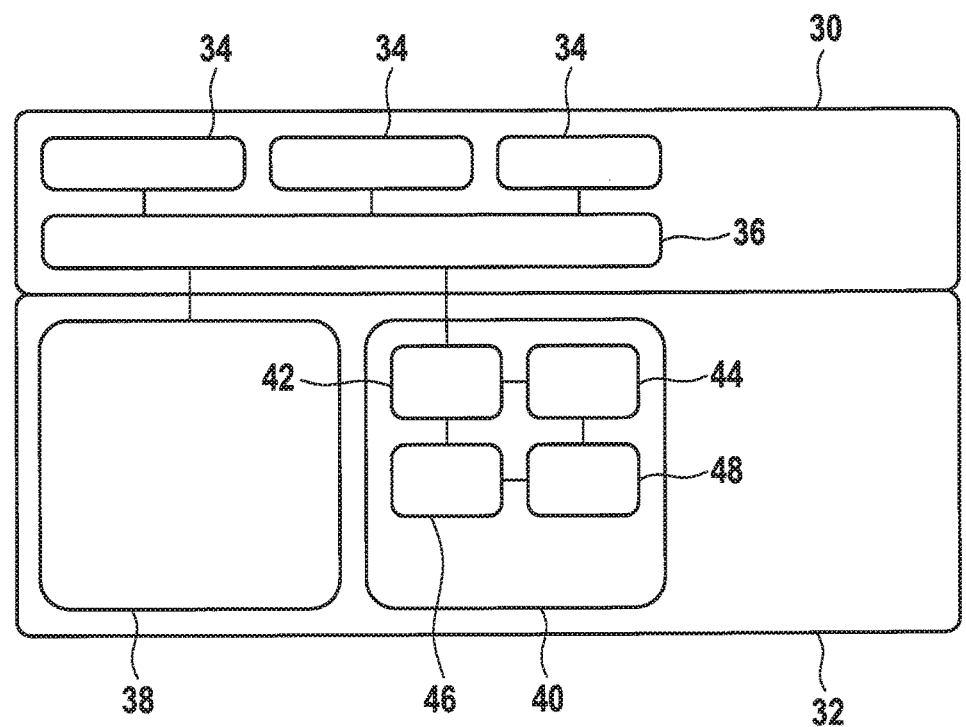
FIG. 2 shows functions of an HSM in a schematic representation.

In contrast to typical back and IT systems, the hardware layer of embedded systems is often exposed to physical attacks, which influence hardware or software functions through physical means, for example manipulate a flash memory or deactivate alarm functions. One approach for making such physical attacks more difficult is to use in particular manipulation-protected hardware security modules (HSM), as they are shown in FIG. 2, for example. Such an HSM protects important information, for example personal identification numbers (PIN), secure keys and critical operations, for example a PIN verification, a data encryption, for example through strong physical shielding.

The following illustrates how an HSM may be designed and what functions the same may be able to carry out to improve the security of an embedded system.

FIG. 2 shows the core functions of a typical hardware security module. The illustration shows a software layer 30 and a hardware layer 32, which is protected against unauthorized accesses.

Software layer 30 includes a number of applications 34, of which three are shown here. In addition, an operating system 36 is provided. Hardware layer 32 includes embedded standard hardware 38 and a hardware security module (HSM) 40. In this HSM 40, a first block 42 for interfaces and control, a second block 44 for secure encryption functions, a third block 46 for secure functions, and a secure memory 48 are provided.

Secure memory 48 is a small, non-volatile data memory, for example having a capacity of several kilobytes, within the manipulation-protected HSM 40 to prevent a non-authorized read-out, a manipulation or a deletion of critical information, such as of cryptographic keys, cryptographic certificates or authentication data, for example PINs or passwords. Secure memory 48 of HSM 40 furthermore contains all HSM configuration information, for example information about the owner of HSM 40 or access authorizations to secured internal units.

Second block 44 for secure encryption functions contains cryptographic algorithms which are used for data encryption and decryption, for example AES or 3DES, data integrity enhancement, for example MAC or HMAC, data origin verification, for example by using digital signature algorithms, such as RSA or ECC, and all associated cryptographic activities, such as key generation, key verification.

Secure functions in third block 46 include all protected functions which are not directly assigned to a cryptographic method, HSM 40 serving as a physically protected "trust anchor." This may be, for example, a physically protected clock signal, an internal random number generator, a bootstrap protection mechanism, or some critical application function, for example to implement a secure dongle.

First block 42 for interfaces and control includes the internal HSM logic which implements the HSM communication with the outside world and manages the operation of all internal base components, as they are mentioned above.

All functional base components of hardware security module 40, as is described above, are surrounded by a continuous physical boundary, which prevents internal data and processes from being tapped, copied or emulated, or manipulated. This could cause an unauthorized user to be able to use or compromise internal secrets. The cryptographic boundary is usually implemented with algorithmic and physical time slot countermeasures having dedicated access protection means, for example a special shield or coatings, to enable a side channel resistance, an access notice, an access resistance, or an access response.

It is described hereafter how HSM 40 is able to improve the security of an embedded product approach:

HSM 40 protects critical information, for example identities, signature keys or keys, through the physical shield, which may not be bypassed by a software susceptibility.

HSM 40 may help detect, weaken or ward powerful point of interest (POI) attackers in that effective side channel resistance and access protection barriers are implemented, which, among other things, have strong access restrictions, even for authorized users. For example, some pieces of information are always exclusively kept within HSM 40.

HSM 40 may accelerate security mechanisms in which certain acceleration circuits are used.

HSM 40 may be used to reduce security costs in that highly optimized specialized circuits are added, for example for a standardized cryptography.

Figure 3:
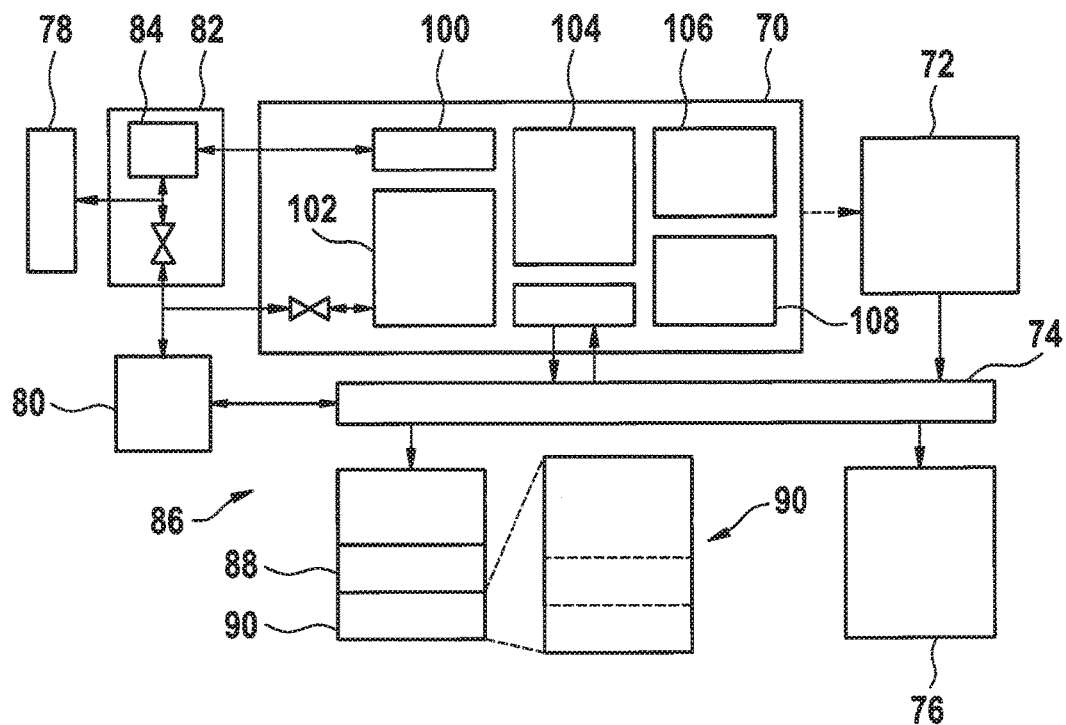
FIG. 3 shows the configuration of one embodiment of the HSM in a schematic representation.

A possible configuration of the HSM is shown in FIG. 3. It shows HSM 70 which is embedded in an environment. The illustration shows a main central processing unit 72, a system bus 74, a RAM component 76 having an area to be used jointly, and a test program 78 or debugger having associated hardware 80 and interface 82, which in turn includes a register 84. The illustration furthermore shows a memory chip 86 for flash code having a data area 88 and a secure area 90, in which secure core data are contained.

An interface 100 to test program 78, a secure processing core 102, a secure RAM component 104, a random generator 106, for example a TRNG or PRNG, and keys 108, for example AES, are provided in HSM 70.

In the introduced method, already present mechanisms detecting a manipulation, for example using real time track data (RTDD), or when memory limits are exceeded, for example with the aid of MPU, hypervisor and run time limits, may be evaluated by the HSM, such as with the aid of a watchdog, operating system, and based thereon, if necessary, the deactivation of functions or switch to substitute functions may be derived.

It is established via the MPU, for example, whether the function leaves the memory area assigned to it. As an alternative or in addition, the watchdog may be used to establish whether the function violates the requirements in regard to the run time. A close connection exists between the operating system of the main processing core and the HSM, i.e., the HSM may provide the operating system at regular intervals with the piece of information whether a function is allowed to be carried out.

The existing security infrastructure is used to activate new performance features. With this concept, subsequent programming of the new features is possible. It should be noted that previously the features to be activated have already been onboard. Should a subsequently installed app not function correctly, it is possible to switch back to the previous software again.

Figure 4:
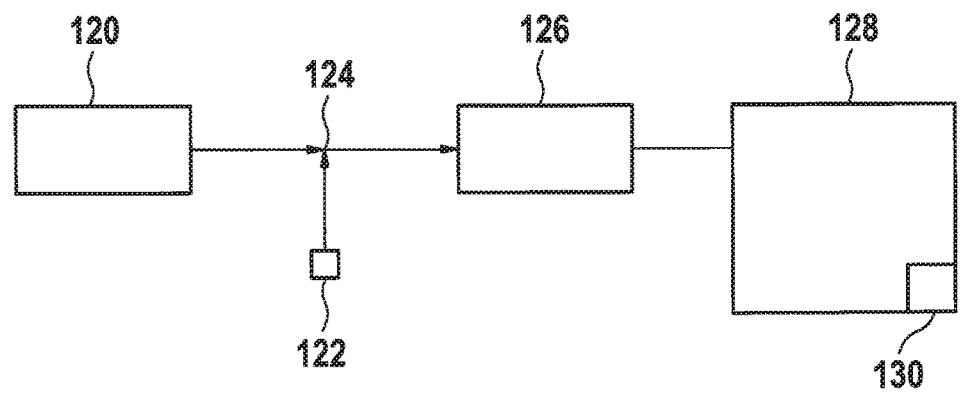
FIG. 4 shows an encryption of a software container according to the related art.

FIG. 4 shows a method for encrypting a software container according to the related art. The software container may be exchanged between a tester and a control unit. Initially, a software container 120 is present in which data are stored unencrypted. These data are encrypted 124 using a secret key 122, so that container 126 having encrypted data is obtained. This container is transmitted together with the secret key to a control unit 128, which includes an area 130, the so-called customer block (CB), in which the secret key is stored.

Due to the fact that the secret key suitable for decryption, which is comparatively unprotected, is also transmitted in addition to the encrypted data, this method is not secure.

Figure 5:
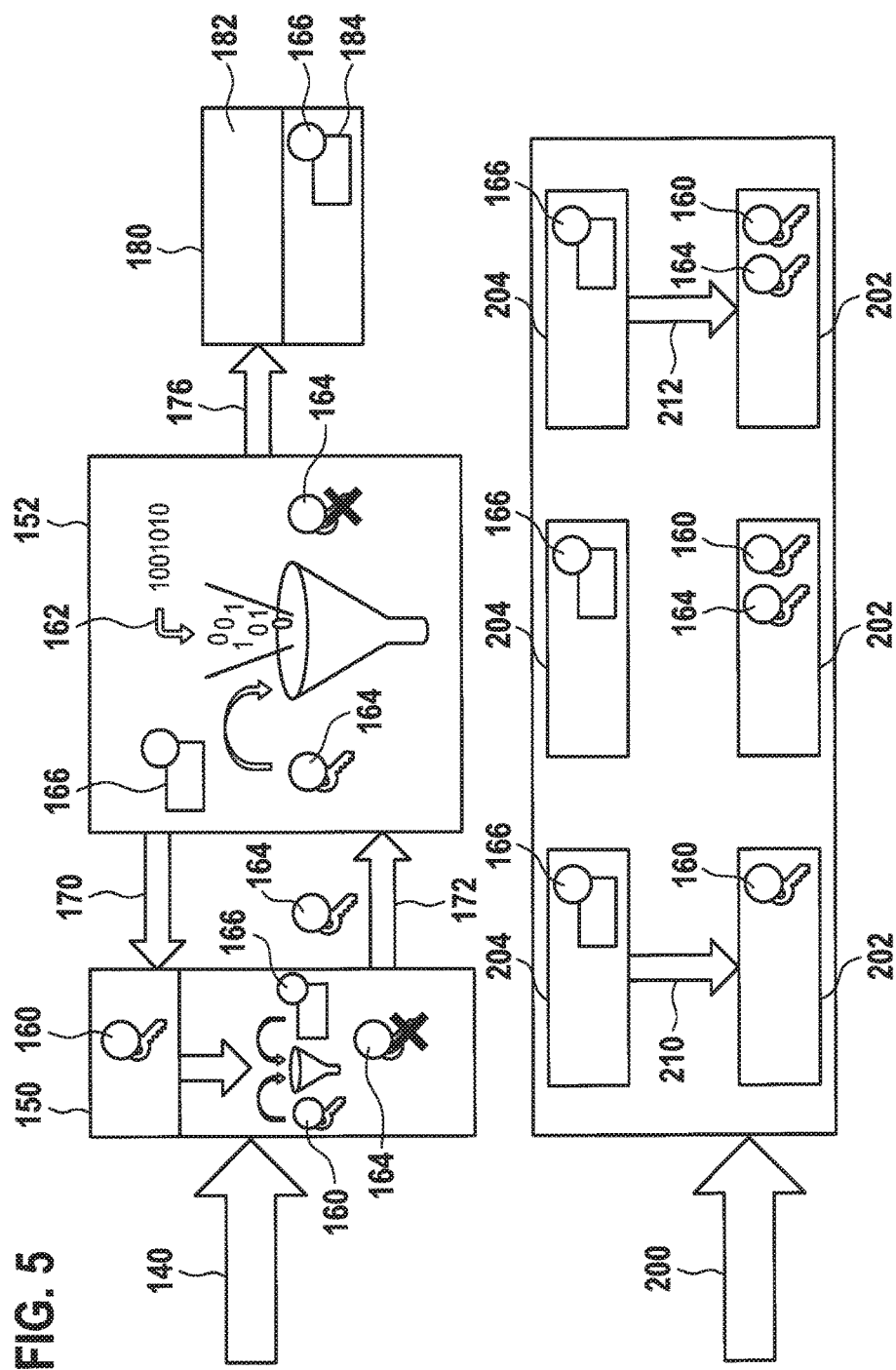
FIG. 5 shows one possible specific embodiment of the introduced method.

One specific embodiment of the described method is shown in FIG. 5. In the illustration, the creation of an encrypted software container is described at the top, denoted by arrow 140, and the decryption of the software container is described at the bottom, denoted by arrow 200.

In the method for encrypting, a so-called public key infrastructure (PKI) 150 and a tool environment 152, which is here also referred to as a tool chain, are used. PKI 150 is a system which is able to issue, distribute and check digital certificates.

A secret key 160, which in this embodiment is a symmetric key, is stored in PKI 150. In PKI 150, a further secret key 164, which is subsequently referred to as derived key 164, is derived from secret key 160. This takes place using secret key 160 and a random number 166, which in this case is the identifier which is generated in tool chain 152 and transmitted to PKI 150 in a step 170.

This derived secret key 164 is transmitted in a further step 172 by PKI 150 to tool chain 152. Tool chain 152 is provided with a software container 162, in which data or software is/are stored, whereupon tool chain 152 encrypts the data using the derived secret key 164. Thereupon, tool chain 152 deletes the derived secret key 164. Subsequently, in a step 176, tool chain 152 creates an encrypted container 180 including encrypted data 182 and an area 184 in which random number 166 is stored.

The illustration at the bottom, denoted by arrow 200, shows the use of an HSM 202 during the decryption in conjunction with an area 204, which herein was already referred to as CB.

Initially, a programming software requests a derivation of secret key 160 with random number 166 from HSM 202, in which secret key 160 is stored. For this purpose, in a first step 210, random number 166 is transmitted from area 204 into HSM 202. HSM 202 derives the derived secret key 164 therefrom.

Furthermore, the programming software in a further step 212 transfers the encrypted software container to HSM 202 for decryption. HSM 202 then decrypts the software container using the derived secret key 164.

It is of significance that no secret key has to be transmitted along with the transmission, but only an identifier, for example a random number, which alone is not sufficient for an unauthorized attacker to decrypt the transmitted data.

What is claimed is:

1. A method for providing secure data communication within components of a motor vehicle, comprising:
   receiving, by processing circuitry and from a tester, data to be encrypted;
   deriving, by the processing circuitry, a derived key from (a) a secret key that is stored in a storage location of the motor vehicle, the storage location being locally accessible to a control unit of the motor vehicle and (b) an identifier;
   the processing circuitry encrypting the data received from the tester using the derived key;
   the processing circuitry encapsulating the encrypted data and the identifier in a container; and
   the processing circuitry outputting the container to the control unit of the motor vehicle, based on which the control unit is configured to:
      obtain the data by:
         deriving the derived key from (a) the secret key that is stored in the storage location of the motor vehicle and (b) the identifier included in the container; and
         decrypting the encrypted data included in the container using the derived key; and
      process the decrypted data for testing for errors in the processing by the control unit of the decrypted data.

2. The method as recited in claim 1, wherein the encryption is performed using a tool chain, which provides the identifier.

3. The method as recited in claim 2, wherein a random number serves as the identifier.

4. The method as recited in claim 3, wherein the derivation is performed using a public key infrastructure, which provides the secret key.

5. The method as recited in claim 3, further comprising the control unit performing the decrypting in response to receipt of the encrypted data.

6. The method as recited in claim 5, wherein the encrypted data are decrypted in a hardware security module of the control unit.

7. A data-exchange system within a motor vehicle for providing secure data communication, comprising:
   processing circuitry configured to:
      derive a derived key from (a) a secret key that is stored in a storage location of the motor vehicle, the storage location being locally accessible to a control unit of the motor vehicle and (b) an identifier;
      encrypt data received by the processing circuitry from a tester, wherein the encryption is performed using the derived key;
      encapsulate the encrypted data and the identifier in a container; and
      output the container to the control unit of the motor vehicle, based on which the control unit is configured to:
         obtain the data by:
            deriving the derived key from (a) the secret key that is stored in the storage location of the motor vehicle and (b) the identifier included in the container; and
            decrypting the encrypted data included in the container using the derived key; and
         process the decrypted data for testing for errors in the processing by the control unit of the decrypted data.

* * * * *